(12) United States Patent
Pawar et al.

(10) Patent No.: US 11,700,554 B1
(45) Date of Patent: *Jul. 11, 2023

(54) DYNAMIC AIR-INTERFACE RECONFIGURATION BASED ON PREDICTED MOVEMENT TOWARD LOCATION WHERE DUAL-CONNECTIVITY TENDS TO BE LOST

(71) Applicant: Sprint Spectrum L.P., Overland Park, KS (US)

(72) Inventors: Hemanth B. Pawar, Brambleton, VA (US); Krishna Sitaram, Chantilly, VA (US); Shilpa K. Srinivas, Brambleton, VA (US)

(73) Assignee: Sprint Spectrum LLC, Bellevue, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/661,883

(22) Filed: May 3, 2022

Related U.S. Application Data

(63) Continuation of application No. 16/885,096, filed on May 27, 2020, now Pat. No. 11,343,729.

(51) Int. Cl.
*H04W 36/00* (2009.01)
*H04W 36/30* (2009.01)
*H04W 36/08* (2009.01)

(52) U.S. Cl.
CPC ....... *H04W 36/0069* (2018.08); *H04W 36/08* (2013.01); *H04W 36/305* (2018.08)

(58) Field of Classification Search
CPC .......... H04W 36/0069; H04W 36/305; H04W 36/08
See application file for complete search history.

(56) References Cited

U.S. PATENT DOCUMENTS

| 6,097,953 A | 8/2000 | Bonta et al. |
| 6,266,529 B1 | 7/2001 | Chheda |
| (Continued) | | |

FOREIGN PATENT DOCUMENTS

| WO | WO 2015/181256 | 12/2015 | |
| WO | WO-2015181256 A1 * | 12/2015 | .............. H04W 4/02 |
| (Continued) | | | |

*Primary Examiner* — Chi H Pham
*Assistant Examiner* — Ji-Hae Yea
(74) *Attorney, Agent, or Firm* — McDonnell Boehnen Hulbert & Berghoff LLP

(57) ABSTRACT

A method and system for controlling air-interface connectivity of a user equipment device (UE). A computing system detects, when the UE has dual connectivity including a first air-interface connection with a first access node and a second air-interface connection with a second access node, and when the first air-interface connection is defined on a first carrier, that the UE is moving toward a geographic area where UEs that were served by the first access node on the first carrier as part of dual connectivity lost their dual connectivity due to their having insufficient aggregate dual-connectivity throughput. And based at least on the detecting, the computing system reconfigures the first air-interface connection of the UE's dual connectivity to be defined on a lower-frequency second carrier, to help avoid having the UE lose its dual connectivity.

20 Claims, 5 Drawing Sheets

[Flowchart Block 38:] DETECT THAT, WHEN A UE HAS DUAL CONNECTIVITY INCLUDING A FIRST AIR-INTERFACE CONNECTION EXTENDING BETWEEN A FIRST ACCESS NODE AND THE UE AND A SECOND AIR-INTERFACE CONNECTION EXTENDING BETWEEN A SECOND ACCESS NODE AND THE UE, AND WHEN THE FIRST AIR-INTERFACE CONNECTION IS DEFINED ON A FIRST RF CARRIER, THAT THE UE IS MOVING TOWARD A GEOGRAPHIC LOCATION WHERE UEs THAT WERE SERVED BY THE FIRST ACCESS NODE ON THE FIRST RF CARRIER AS PART OF DUAL-CONNECTIVITY LOST THEIR DUAL CONNECTIVITY DUE AT LEAST TO THEIR HAVING INSUFFICIENT AGGREGATE DUAL-CONNECTIVITY THROUGHPUT

[Flowchart Block 40:] BASED AT LEAST ON THE DETECTING, (i) SELECT A SECOND RF CARRIER BASED AT LEAST ON THE SECOND RF CARRIER BEING LOWER FREQUENCY THAN THE FIRST RF CARRIER, SUCH AS BEING IN A LOWER FREQUENCY BAND THAN THE FIRST RF CARRIER, AND (ii) RECONFIGURE THE FIRST AIR-INTERFACE CONNECTION OF THE UE'S DUAL-CONNECTIVITY TO BE DEFINED ON THE SELECTED SECOND RF CARRIER INSTEAD OF ON THE FIRST RF CARRIER

(56) References Cited

U.S. PATENT DOCUMENTS

| | | | |
|---|---|---|---|
| 7,076,245 B1* | 7/2006 | Satapathy | H04W 24/08 370/332 |
| 7,082,303 B2 | 7/2006 | Sayeedi et al. | |
| 7,133,675 B2 | 11/2006 | Hunzinger | |
| 7,349,699 B1 | 3/2008 | Kelly et al. | |
| 8,391,872 B1 | 3/2013 | Shetty et al. | |
| 8,995,393 B2 | 3/2015 | Siomina et al. | |
| 10,034,205 B2 | 7/2018 | Kazmi et al. | |
| 10,356,631 B1 | 7/2019 | Pawar et al. | |
| 10,999,855 B1* | 5/2021 | Singh | H04W 76/10 |
| 2003/0134637 A1 | 7/2003 | Cooper | |
| 2005/0260990 A1 | 11/2005 | Huang et al. | |
| 2007/0087752 A1 | 4/2007 | Voyer et al. | |
| 2007/0248043 A1 | 10/2007 | Afrashteh et al. | |
| 2008/0113670 A1 | 5/2008 | Dufour et al. | |
| 2015/0146588 A1 | 5/2015 | Park | |
| 2016/0087877 A1 | 3/2016 | Ryu et al. | |
| 2016/0100447 A1* | 4/2016 | Chen | H04W 74/004 370/329 |
| 2016/0198474 A1 | 7/2016 | Raghavan et al. | |
| 2017/0099621 A1* | 4/2017 | Michaelsen | H04W 36/0033 |
| 2017/0111854 A1* | 4/2017 | Ho | H04B 7/14 |
| 2019/0200406 A1* | 6/2019 | Henttonen | H04W 28/0268 |
| 2020/0015142 A1* | 1/2020 | Jia | H04W 76/15 |
| 2020/0351968 A1* | 11/2020 | Yilmaz | H04W 76/25 |

FOREIGN PATENT DOCUMENTS

| | | | |
|---|---|---|---|
| WO | 2021/089684 | 5/2021 | |
| WO | WO-2021089684 A1 * | 5/2021 | H04W 36/0069 |

* cited by examiner

| DETECT THAT, WHEN A UE HAS DUAL CONNECTIVITY INCLUDING A FIRST AIR-INTERFACE CONNECTION EXTENDING BETWEEN A FIRST ACCESS NODE AND THE UE AND A SECOND AIR-INTERFACE CONNECTION EXTENDING BETWEEN A SECOND ACCESS NODE AND THE UE, AND WHEN THE FIRST AIR-INTERFACE CONNECTION IS DEFINED ON A FIRST RF CARRIER, THAT THE UE IS MOVING TOWARD A GEOGRAPHIC LOCATION WHERE UEs THAT WERE SERVED BY THE FIRST ACCESS NODE ON THE FIRST RF CARRIER AS PART OF DUAL-CONNECTIVITY LOST THEIR DUAL CONNECTIVITY DUE AT LEAST TO THEIR HAVING INSUFFICIENT AGGREGATE DUAL-CONNECTIVITY THROUGHPUT | 38 |

↓

| BASED AT LEAST ON THE DETECTING, (i) SELECT A SECOND RF CARRIER BASED AT LEAST ON THE SECOND RF CARRIER BEING LOWER FREQUENCY THAN THE FIRST RF CARRIER, SUCH AS BEING IN A LOWER FREQUENCY BAND THAN THE FIRST RF CARRIER, AND (ii) RECONFIGURE THE FIRST AIR-INTERFACE CONNECTION OF THE UE'S DUAL-CONNECTIVITY TO BE DEFINED ON THE SELECTED SECOND RF CARRIER INSTEAD OF ON THE FIRST RF CARRIER | 40 |

Fig. 2

DYNAMIC AIR-INTERFACE RECONFIGURATION BASED ON PREDICTED MOVEMENT TOWARD LOCATION WHERE DUAL-CONNECTIVITY TENDS TO BE LOST

REFERENCE TO RELATED APPLICATION

This is a continuation of U.S. patent application Ser. No. 16/885,096, filed May 27, 2020, the entirety of which is hereby incorporated by reference.

BACKGROUND

A cellular wireless network typically includes a number of access nodes that are configured to provide wireless coverage areas in which user equipment devices (UEs) such as cell phones, tablet computers, machine-type-communication devices, tracking devices, embedded wireless modules, and/or other wirelessly equipped communication devices (whether or not user operated) can operate. Each access node could be coupled with a core network that provides connectivity with various application servers and/or transport networks, such as the public switched telephone network (PSTN) and/or the Internet for instance. With this arrangement, a UE within coverage of the cellular network could engage in air interface communication with an access node and could thereby communicate via the access node with various application servers and other entities.

Such a network could operate in accordance with a particular radio access technology (RAT), with communications from the access nodes to UEs defining a downlink or forward link and communications from the UEs to the access nodes defining an uplink or reverse link.

Over the years, the industry has developed various generations of RATs, in a continuous effort to increase available data rate and quality of service for end users. These generations have ranged from "1G," which used simple analog frequency modulation to facilitate basic voice-call service, to "4G"—such as Long Term Evolution (LTE), which now facilitates mobile broadband service using technologies such as orthogonal frequency division multiplexing (OFDM) and multiple input multiple output (MIMO). And most recently, the industry is now exploring developments in "5G" and particularly "5G NR" (5G New Radio), which may use a scalable OFDM air interface, advanced channel coding, massive MIMO, beamforming, and/or other features, to support higher data rates and countless applications, such as mission-critical services, enhanced mobile broadband, and massive Internet of Things (IoT).

In accordance with the RAT, each access node could operate on one or more radio-frequency (RF) carriers, each of which could be frequency division duplex (FDD), with separate frequency channels for downlink and uplink communication, or time division duplex (TDD), with a single frequency channel multiplexed over time between downlink and uplink use. Each such frequency channel could be characterized by a center frequency and particular bandwidth (width of frequency) centered on that center frequency.

Each such carrier could be defined within an industry standard frequency band, by its frequency channel(s) being defined within the frequency band. Examples of such frequency bands include, without limitation, (i) Band 25, which supports FDD carriers and extends from 1850 MHz to 1915 MHz on the uplink and 1930 MHz to 1995 MHz on downlink, (ii) Band 26, which supports FDD carriers and extends from 814 MHz to 849 MHz on the uplink and 859 MHz to 894 MHz on the downlink, (iii) Band 71, which supports FDD carriers and extends from 663 MHz to 698 MHz on the uplink and 617 MHz to 652 MHz on the downlink, (iv) Band 41, which supports TDD carriers and extends from 2496 MHz to 2690 MHz, (v) Band N260, which supports TDD carriers and extends from 27 GHz to 40 GHz, and (vi) Band N261, which supports TDD carriers and extends from 27.5 GHz to 28.35 GHz.

On the downlink and uplink, the air interface provided by an access node on a given carrier could be configured in a specific manner to define physical resources for carrying information wirelessly between the access node and UEs.

In a non-limiting example implementation, for instance, the air interface could be divided over time into frames, subframes, and symbol time segments, and over frequency into subcarriers that could be modulated to carry data. The example air interface could thus define an array of time-frequency resource elements each being at a respective symbol time segment and subcarrier, and the subcarrier of each resource element could be modulated to carry data.

Further, in each subframe or other transmission time interval, the resource elements on the downlink and uplink of the example air interface could be grouped to define physical resource blocks (PRBs) that could be allocated as needed to carry data between the access node and served UEs.

In addition, certain resources on the downlink and/or uplink of the air interface could be reserved for special purposes.

On the downlink, for instance, certain resource elements in each downlink subframe could be generally reserved to define a downlink control channel for carrying control signaling such as PRB-allocation directives and the like to served UEs, and other resource elements in each downlink subframe could be generally reserved to define an uplink shared channel in which the PRBs noted above can be allocated to carry data from the access node to UEs. Further, certain resource elements in designated downlink subframes could be reserved to carry synchronization signals that UEs could detect as an indication of coverage, other resource elements in designated downlink subframes could be reserved to carry system information messages, and still other resource elements distributed in a defined pattern throughout each downlink subframe could be reserved to carry a reference signal that UEs could measure in order to determine coverage strength.

And on the uplink, certain resource elements in each uplink subframe could be generally reserved to define an uplink control channel for carrying control signaling such as scheduling requests from UEs to the access node, and other resource elements in each uplink subframe could be generally reserved to define an uplink shared channel in which the PRBs noted above can be allocated to carry data from UEs to the access node. Further, certain resource elements on the uplink could be specially reserved to carry other uplink signals, such as random access signals, sounding reference signals, and the like.

Other air-interface configurations are possible as well.

OVERVIEW

When a UE enters into coverage of an example network, the UE could detect threshold strong coverage of an access node on a particular carrier (e.g., a threshold strong reference signal broadcast by the access node on the carrier), and the UE could then engage in random-access and connection signaling, such as Radio Resource Control (RRC) signaling, to establish an air-interface connection (e.g., RRC connection) through which the access node will then serve the UE on that carrier.

Further, if the UE is not already registered for service with the core network, the UE could transmit to the access node an attach request, which the access node could forward to a core-network controller for processing. And the core-network controller and access node could then coordinate setup for the UE of one or more user-plane bearers, each including (i) an access-bearer portion that extends between the access node and a core-network gateway that provides connectivity with a transport network and (i) a data-radio-bearer portion that extends over the air between the access node and the UE.

Once the UE is so connected and registered, the access node could then serve the UE in a connected mode over the air-interface connection, managing downlink air-interface communication of packet data to the UE and uplink air-interface communication of packet data from the UE. For instance, when the core network has packet data for transmission to the UE, the data could flow to the access node and the access node could schedule and provide transmission of the data in downlink PRBs to the UE. And when the UE has data to transmit on the uplink, the UE could send a scheduling request to the access node, the access node could schedule transmission of the data in uplink PRBs, and the UE could accordingly transmit the data.

When the industry advances from one generation of wireless technology to the next, or in other scenarios, networks and UEs may also support dual-connectivity service, where a UE is served on co-existing connections according to multiple different RATs.

For instance, the network could be equipped with an access node that provides coverage and service according to a first RAT ("first-RAT access node") and another access node that provides overlapping coverage and service according to a second RAT ("second-RAT access node"), and a UE positioned within coverage of those access nodes could have a first radio configured to engage in service according to the first RAT and a second radio configured to engage in service according to the second RAT. With this arrangement, the UE may be able to establish a first air-interface connection with the first-RAT access node according to the first RAT and a second air-interface connection with the second-RAT access node according to the second RAT, and the access nodes may then concurrently serve the UE over those connections according to their respective RATs.

Such dual-connectivity (or "non-standalone" connectivity) could help facilitate increased peak data-rate of communications, by multiplexing the UE's communications across the multiple air-interface connections. Further or alternatively, dual-connectivity may provide other benefits compared with serving a UE on a single connection according to a single RAT (as "standalone" connectivity).

In a representative dual-connectivity implementation, the first-RAT access node could operate as a master node (MN), responsible for coordinating setup and teardown of dual-connectivity service for the UE and possibly functioning as an anchor point for RRC signaling and core-network control signaling related to the dual-connectivity service, and the second-RAT access node could function as a secondary node (SN), mainly to provide added connectivity and increased aggregate bandwidth for the UE.

When the UE enters into coverage of such a system, the UE could initially scan for and discover threshold strong first-RAT coverage of the MN on a given carrier, and the UE could responsively engage in signaling as discussed above to establish a first-RAT air-interface connection between the UE and the MN on that carrier. Further, the UE could engage in attach signaling with a core-network controller via the MN, and the core-network controller and MN could coordinate establishment for the UE of at least one user-plane bearer as discussed above. The MN could then serve the UE in a standalone mode with packet-data communications in the manner described above on the UE's first-RAT connection.

Further, perhaps having determined from profile data that the UE is dual-connectivity-capable, the MN could trigger and/or engage in a process to establish for the UE a second-RAT air-interface connection between the UE and an SN, so that the MN and SN can then cooperatively provide the UE with dual-connectivity service. For instance, the MN could direct the UE to scan for secondary coverage under the second RAT, possibly identifying one or more SNs and carriers for which the UE should scan, and could receive in response from the UE a report that the UE detects threshold strong coverage of an SN on a given carrier. And the MN could then coordinate setup of dual-connectivity service so that the UE can be served concurrently by the MN and the SN.

While the specifics of setting up dual-connectivity may vary from implementation to implementation, in an example, the MN could engage in signaling with the SN, with the UE, and with the core-network controller, to coordinate setup of the dual-connectivity service. For instance, the MN could engage in signaling with the UE and with the SN to coordinate setup of a second-RAT connection between the UE and the SN on a second-RAT carrier. And the MN could engage in signaling with the core-network controller and/or with the SN to coordinate setup of a split bearer for the UE (e.g., for each of one or more user-plane bearers established for the UE) so that the MN could then serve a portion of the UE's data communications and the SN could serve another portion of the UE's data communications.

With dual-connectivity service so established through this and/or other steps, the MN and SN could then concurrently serve the UE over their respective connections with the UE, perhaps with both providing for both downlink and uplink downlink scheduled data communication, or perhaps with both providing for downlink scheduled data communication but just the one of the access nodes providing for uplink scheduled data communication, among other possibilities.

On the downlink, for instance, when the core network has data destined to the UE, the MN could coordinate downlink transmission of a portion of the data over the air from the MN to the UE as discussed above, and the SN could coordinate downlink transmission of another portion of the data over the air from the SN to the UE as discussed above. Likewise, when the UE has data to transmit, the UE could send to the MN a scheduling request for transmission of a portion of the data to the MN, and the MN could coordinate uplink transmission of that data over the air from the UE to the MN, and the UE could send to the SN a scheduling request for transmission of another portion of the data to the SN, and the SN could coordinate uplink transmission of that data over the air from the UE to the SN. Or the UE could limit its uplink transmission to just one of the access nodes.

In a representative dual-connectivity implementation, the MN may require that a UE receive at least a threshold high level of wireless-communication performance in order to justify maintaining the UE's dual connectivity. For instance, the MN may require that the UE have at least a predefined threshold high level of data throughput (e.g., on the uplink or on the downlink) in aggregate across the UE's two air-interface connections in order to justify maintaining the UE's dual connectivity. If the UE does not attain or maintain this minimum level of throughput, then the MN may responsively de-configure the UE's dual connectivity, reversing the dual-connectivity-setup process noted above, and switching the UE back to standalone first-RAT connectivity, which may have a lower minimum throughput requirement if any. Further, the MN may condition this decision on one or more additional factors as well, such as evaluation of air-interface load or expected levels of traffic, among other possibilities.

When a UE is served with dual connectivity and is located close enough to its serving access nodes, the UE may have the required level of aggregate data throughput. However, when a UE is located farther from its serving access nodes, the UE may not be able to attain or maintain that aggregate level of data throughput. For instance, when the UE is located farther from its serving access nodes, RF path loss and other issues could more readily degrade the quality of communications between the UE and the access nodes, and the degraded quality of communications could translate into a lower effective bit rate of the UE's communications.

Further, this degradation of communication quality and associated reduction in bit rate could vary based on the RF frequencies of the carriers on which the UE is being served. In practice, for instance, path loss could increase with frequency, so that higher frequency carriers would have higher path loss than lower frequency carriers. As a result, if a UE is served by an access node on a relatively high-frequency carrier and the UE is located relatively far away from the access node and/or there are RF obstructions or interference issues, the UE's air-interface communication with that access node might be relatively low throughput. And if the UE is served with dual connectivity when faced with this issue as to one or both of the UE's serving access nodes, the UE's aggregate data throughput may be relatively low, which could lead to the MN de-configuring the UE's dual connectivity.

The present disclosure provides a mechanism to help address this technical problem.

In accordance with the disclosure, a computing system will determine when a UE that is served by an access node on a given carrier as part of dual connectivity is moving toward a location where other UEs that were served by the access node on that carrier as part of dual connectivity lost their dual connectivity due to poor wireless-communication performance. The computing system will then respond to this by causing reconfiguration of the UE's connection with the access node, switching the UE from being connected with the access node on the given carrier to being connected with the access node instead on another carrier selected based on the other carrier being lower frequency than the given carrier. Dynamically switching the UE to a lower-frequency carrier in this situation may help increase the UE's aggregate throughput, which may help avoid having the UE lose its dual connectivity.

These as well as other aspects, advantages, and alternatives will become apparent to those reading the following description, with reference where appropriate to the accompanying drawings. Further, it should be understood that the discussion in this overview and elsewhere in this document is provided by way of example only and that numerous variations are possible.

BRIEF DESCRIPTION OF THE DRAWINGS

FIG. 2 is a flow chart depicting an example method in accordance with the present disclosure.

DETAILED DESCRIPTION

An example implementation will now be described in the context of 4G LTE, 5G NR, and 4G-5G dual connectivity, such as EUTRA-NR Dual Connectivity (EN-DC). With EN-DC, a 4G access node (4G evolved Node-B (eNB)) typically functions as the MN, and a 5G access node (5G next-generation Node-B (gNB)) typically functions as the secondary access node. Thus, a UE would first establish a standalone-4G connection with a 4G eNB, and the 4G eNB could then coordinate setup of EN-DC service for the UE, including setup for the UE of a secondary 5G connection with a 5G gNB. And the 4G eNB and 5G gNB could then concurrently serve the UE over their respective 4G and 5G connections with the UE. It should be understood, however, that the principles disclosed herein could extend to apply with respect to other scenarios as well, such as with respect to other RATs and other dual-connectivity configurations. Further, it should be understood that other variations from the specific arrangements and processes described are possible. For instance, various described entities, connections, functions, and other elements could be added, omitted, distributed, re-located, re-ordered, combined, or changed in other ways.

Figure 1:
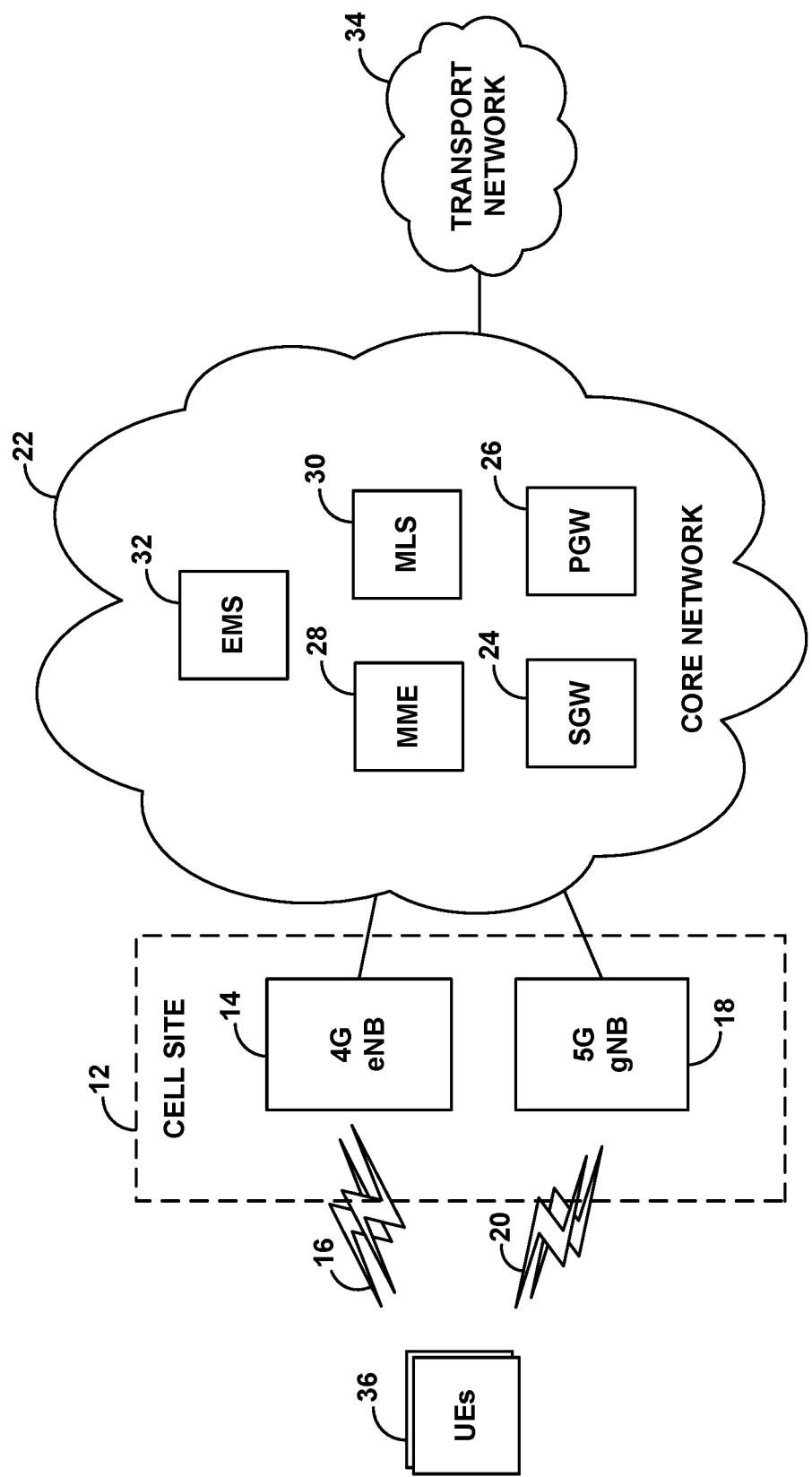
FIG. 1 is a simplified block diagram of an example network arrangement in which features of the present disclosure can be implemented.

FIG. 1 depicts an example network having a cell site 12 including a 4G eNB 14 that is configured to provide 4G service on each of multiple example 4G carriers 16 and an example 5G gNB 18 that is configured to provide 5G service on each of one or more example 5G carriers 20. Each of these access nodes could be a macro access node of the type configured to provide a wide range of coverage or could take other forms, such as a small cell access node, a relay node, a femtocell access node, or the like, which might be configured to provide a smaller range of coverage, among other possibilities. Further, these access nodes could share some equipment, such as an antenna tower and antenna array or the like, and could be configured to provide coverage in largely the same direction as each other, to define an area in which UEs can engage in both 4G service provided by the 4G eNB 14 and 5G service provided by 5G gNB 18.

In representative 4G and 5G implementations, each carrier could be FDD or TDD and could be defined in a given band such as one of those noted above. If a carrier is FDD, the carrier would have separate downlink and uplink channels, and each of these channels would have a respective center frequency and a respective bandwidth. Whereas, if a carrier is TDD, the carrier would have a single channel with a center frequency and bandwidth, and the access node could configure the air-interface on the carrier to have a particular downlink-uplink configuration that establishes what percentage of time the carrier will be downlink versus uplink.

Further, the air interface on each such channel could be structured as described above by way of example, being divided over time into frames, subframes, timeslots, and symbol time segments, and over frequency into subcarriers, thus defining an array of air-interface resource elements grouped into PRBs allocable by the access node as noted above, for use to carry data to or from served UEs. Carrier-structure and/or service on the 4G and 5G air-interfaces, however, could differ from each other in various ways now known or later developed, such as with one implementing variable subcarrier spacing and the other having fixed subcarrier spacing, with one having flexible TDD configuration and the other having fixed TDD configuration, with one having different subcarrier spacing and/or symbol time segment length than the other, and/or with one making different use of MIMO technologies than the other, among other possibilities. As further shown, the example 4G and 5G access nodes in the example arrangement are each connected with a core network 22, which could be an Evolved Packet Core (EPC) network or Next Generation Core (NGC) network, among other possibilities. In the example shown, the core network 22 includes a serving gateway (SGW) 24, a packet data network gateway (PGW) 26, a mobility management entity (MME) 28, a mobile location system (MLS) 30, and an element management system (EMS) 32, although other arrangements are possible as well, including possibly having the access nodes coupled with different core networks than each other.

In an example implementation, without limitation, each access node could have an interface through the core network 22 with the SGW 24, the SGW 24 could have an interface with the PGW 26, and the PGW 26 could provide connectivity with a transport network 34. In addition, each access node could have an interface through the core network 22 with the MME 28, and the MME 28 could have an interface with the SGW 24, so that the MME 28 could coordinate setup of bearers for UEs to enable the UEs to engage in packet-data communications. Alternatively, just the 4G eNB 14 might have an interface with the MME 28 and may function as an anchor for core-network control signaling with the MME 28 both for 4G service and for 5G service with EN-DC.

Further, the MLS 30 could be a computing-system platform configured to determine (e.g., track) geographic location of UEs using techniques such as trilateration, multilateration (e.g., observed time difference of arrival (OTDOA)), satellite-based positioning, or the like. And the EMS 32 could be a computing-system platform configured to operate as a central repository of operational data for the wireless communication network and to control and manage operation of various network elements.

FIG. 1 further depicts various example UEs 36 that may from time to time be within coverage of the 4G and 5G access nodes and may from time to time be served by the access nodes. In a representative implementation, each such UE may be 4G, 5G, and EN-DC capable. For instance, each UE could include both a 4G radio and associated equipment and logic that enables the UE to connect with and be served by a 4G eNB and a 5G radio and associated equipment and logic that enables the UE to connect with and be served by a 5G gNB. And each UE may include logic that enables the UE to be served with and engage in EN-DC service.

In line with the discussion above, upon entering into coverage of the access nodes as shown, a representative UE 36 could initially scan for 4G coverage and discover threshold strong coverage of 4G eNB 14 on a given 4G carrier 16. For instance, the UE could discover a synchronization signal broadcast at the center frequency of the carrier, the UE could then read a broadcast master information block (MIB) on the carrier to determine the carrier's bandwidth, and the UE could measure strength of a reference signal (e.g., a reference signal receive power (RSRP) and/or reference signal receive quality (RSRQ)) on the carrier and determine that the reference signal is strong enough to justify connecting.

The UE could then engage in random access signaling and RRC signaling with the 4G eNB 14 to establish a 4G connection on the given carrier as discussed above. Further, if appropriate, the UE could engage in attach signaling with the MME 28 through the 4G connection, and the MME 28 could coordinate setup of one or more user-plane bearers for the UE as discussed above, with each such bearer including an access-bearer that includes an S1-U tunnel between the 4G eNB 14 and the SGW 24 and an S5 tunnel between the SGW 24 and the PGW 26 and a DRB tunnel between the 4G eNB 14 and the UE. And the 4G eNB 14 could establish a context record for the UE, indicating the UE's RRC-connected state and indicating the carrier on which the 4G eNB 14 is serving the UE.

The 4G eNB 14 could then serve the UE in a standalone-4G mode.

For instance, when the SGW 24 receives packet data addressed to the UE, the data could flow to the 4G eNB 14, and the 4G eNB 14 could buffer the data, pending transmission of the data to the UE. With the example air-interface configuration noted above, the 4G eNB 14 could then allocate downlink PRBs in an upcoming subframe for carrying at least a portion of the data, defining a transport block, to the UE. And the 4G eNB 14 could then transmit to the UE in a downlink control channel of that subframe a Downlink Control Information (DCI) message that designates the allocated PRBs, and the 4G eNB 14 could accordingly transmit the transport block to the UE in those designated PRBs.

For each such downlink transmission, the UE could then determine if the UE received transport block successfully. For instance, the transmission could carry a cyclic redundancy check (CRC) value computed based on the transport block, and the UE could compute a CRC based on the received transport block and determine whether its computed CRC matches that carried by the transmission. If the UE receives the transmission and determines that the CRC matches or otherwise that the UE received the transport block successfully, then the UE could transmit to the 4G eNB 14 a positive acknowledgement (ACK) control message, and the 4G eNB 14 could then proceed with transmission of a next transport block (if any) to the UE. Whereas, if the UE did not receive the transmission or determined that the CRC did not match and thus that there was an error in the received transport block, then the UE could transmit to the 4G eNB 14 a negative acknowledgement (NACK), in response to which the 4G eNB 14 could attempt the transmission again.

Likewise, on the uplink, when the UE has packet data for transmission on the transport network 34, the UE could buffer the data, pending transmission of the data to the 4G eNB 14, and the UE could transmit to the 4G eNB 14 a scheduling request that carries a buffer status report (BSR) indicating the quantity of data that the UE has buffered for transmission. With the example air-interface configuration noted above, the 4G eNB 14 could then allocate uplink PRBs in an upcoming subframe to carry a transport block of the data from the UE and could transmit to the UE, in a downlink channel of a preceding subframe, a DCI message that designates those upcoming PRBs. And the UE could then accordingly transmit the transport block to the 4G eNB 14 in the designated PRBs.

As with downlink transmission, for each transport block that the UE transmits to the 4G eNB 14, the 4G eNB 14 could determine if the transport block arrived successfully, based on a CRC analysis for instance. And if the 4G eNB 14 received the transmission successfully, then the 4G eNB 14 could transmit to the UE an ACK and could schedule a next uplink transmission from the UE. Whereas, if the 4G eNB 14 did not receive the transmission successfully, then the 4G eNB 14 could transmit to the UE a NACK, and the UE could attempt retransmission to the 4G eNB 14.

Note also that, if the 4G eNB 14 and the UE support carrier-aggregation service, the 4G eNB 14 could add one or more secondary carriers to the UE's 4G connection. In that case, the carrier on which the UE connected with the 4G eNB 14 could be a primary component carrier of the UE's 4G connection, which could be the anchor for control signaling between the UE and the 4G eNB 14, and each added carrier could be a secondary component carrier of the connection.

When the 4G eNB 14 is so serving the UE, the UE could also transmit various operational information to the 4G eNB 14 to assist with the 4G eNB's service of the UE, and/or for other purposes. By way of example, the UE could regularly evaluate and report to the 4G eNB 14 the quality of the UE's coverage from the 4G eNB 14, and the 4G eNB 14 could use the UE's reported coverage quality as a basis to configure air interface transmission and/or for other purposes.

For instance, the UE could regularly determine channel quality based on signal-to-interference-plus-noise ratio (SINR) and other factors and could periodically report to the 4G eNB 14 a channel-quality-indicator (CQI) value that represents the determined level of channel quality. And the 4G eNB 14 could use the UE's latest reported CQI value as a basis to determine a modulation and coding scheme (MCS) to be used in scheduled air-interface communication between the 4G eNB 14 and the UE. Higher reported channel quality could correlate with a higher-order MCS, which could define a higher effective data rate (i.e., higher throughput) between the 4G eNB 14 and the UE. Whereas, lower reported channel quality could correlate with a lower-order MCS, which could define a lower effective data rate (i.e., lower throughput) between the 4G eNB 14 and the UE. Further, the UE could regularly evaluate and report to the 4G eNB 14 the UE's RSRP and/or RSRQ of coverage from the 4G eNB 14, and the 4G eNB 14 could use the reported RSRP and/or RSRQ to control UE mobility, such as to determine when it would be appropriate to hand over the UE to another 4G eNB, among other possibilities.

In addition, as noted above, the 4G eNB 14 could configure EN-DC service for the UE, to enable the UE to be served concurrently by the 4B eNB 12 and the 5G gNB 18.

In practice, for instance, the 4G eNB 14 could transmit to the UE a "B1" (inter-RAT) measurement object that directs the UE to scan for 5G coverage, possibly identifying the various 5G carriers 20 on which the 5G gNB 18 provides service, and the 4G eNB 14 could then receive in response from the UE a measurement report indicating that the UE detects threshold strong coverage on a given such carrier. Alternatively, the 4G eNB 14 might be pre-configured with an indication of the 5G gNB 18 and a particular 5G carrier 20 to blindly use for secondary connectivity for the UE.

The 4G eNB 14, as an MN, could then engage in process to add the 5G gNB 18 as an SN for the UE, such as by transmitting to the 5G gNB 18 an SN-Addition request to cause the 5G gNB 18 to allocate resources for a 5G connection for the UE on the applicable 5G carrier, receiving an SN-Addition-Request acknowledge message from the 5G gNB 18, and engaging in associated RRC signaling with the UE, in response to which the UE could then access and complete establishment of the 5G connection. Further, as part of the EN-DC-configuration process, the 4G eNB 14 could also work to establish for the UE a split bearer for each of one or more user-plane bearers configured for the UE.

And as with the 4G connection, if the 5G gNB 18 and the UE support carrier-aggregation service, the carrier on which the UE connects with the 5G gNB 18 could be a primary component carrier of the UE's 5G connection, and the 5G gNB 18 could add one or more secondary component carriers to the UE's 5G connection as well.

With EN-DC service configured for the UE through this or another process, the 4G eNB 14 and 5G gNB could then serve the UE over their respective 4G and 5G connections with the UE, with operation on each connection in the manner discussed above for instance.

By way of example, when the SGW 24 receives packet data addressed to the UE, a portion of the data could flow to the 4G eNB 14 for handling, and another portion of the data could flow to the 5G gNB 18 for handling. Thus, the 4G eNB 14 could buffer its portion of the data and could coordinate transmission of the data to the UE over the UE's 4G connection, with any applicable acknowledgement signaling and retransmissions. And the 5G gNB 18 could buffer its portion of the data and could coordinate transmission of the data to the UE over the UE's 5G connection, with any applicable acknowledgement signaling and retransmissions.

And when the UE has data to transmit, the UE could send a portion of the data to the 4G eNB 14 and another portion of the data to the 5G gNB. In particular, the UE could buffer a portion of the data for transmission to the 4G eNB 14 and could send to the 4G eNB 14 a scheduling request with a BSR for that data, and the 4G eNB 14 could coordinate transmission of that data from the UE to the 4G eNB 14 over the UE's 4G connection, with any applicable acknowledgment signaling and retransmissions. And the UE could buffer another portion of the data for transmission to the 5G gNB 18 and could send to the 5G gNB 18 a scheduling request with a BSR for that data, and the 5G gNB 18 could coordinate transmission of that data from the UE to the 5G gNB 18 over the UE's 5G connection, with any applicable acknowledgement signaling and retransmissions.

Further, for each such connection, the UE might report to the serving access node the UE's CQI for the UE's communication channel with the access node, and the access node could use the UE's latest reported CQI as a basis to determine an MCS to designate for scheduled air-interface communication over the connection. And for each such connection, the UE might regularly report its coverage strength, such as its RSRP and/or RSRQ, among other possibilities.

In line with the discussion above, the 4G eNB 14, operating as MN for the UE's dual connectivity, might require the UE to have a minimum level of aggregate throughput on the UE's connections as a basis to maintain the UE's dual connectivity. And if and when the UE's aggregate throughput falls below that minimum level, the 4G eNB 14 could then de-configure the UE's dual connectivity, reverting the UE to standalone-4G connectivity and service.

The 4G eNB 14 could monitor the UE's aggregate throughput in various ways to determine when to de-configure the UE's dual connectivity. Further, as noted above, the analysis could be with respect to the UE's downlink or with respect to the UE's uplink.

As to the uplink, for example, the 4G eNB 14 and 5G gNB 18 could each track the quantity of user-plane data (e.g., packet data) communicated over their respective connection from the UE per unit time, perhaps on average over a recent sliding window of time, and the 4G eNB 14 could sum those quantities to compute an aggregate measure of the UE's uplink throughput. For instance, the 4G eNB 14 might compute and record an average of the UE's uplink throughput on the UE's 4G connection over a recent sliding window of time, and the 5G gNB might compute and report to the 4G eNB 14 average of the UE's uplink throughput on the UE's 5G connection over largely the same recent sliding window of time. The 4G eNB 14 could then sum those two measures of uplink throughput to compute the UE's aggregate uplink throughput across the UE's 4G and 5G connections.

Likewise, as to the downlink, the 4G eNB 14 and 5G gNB 18 could each track the quantity of user-plane data communicated over their respective connection to the UE per unit time, perhaps on average over a recent sliding window of time, and the 4G eNB 14 could sum those quantities to compute an aggregate measure of the UE's downlink throughput. For instance, the 4G eNB 14 might compute and record an average of the UE's downlink throughput on the UE's 4G connection over a recent sliding window of time, and the 5G gNB might compute and report to the 4G eNB 14 average of the UE's downlink throughput on the UE's 5G connection over largely the same recent sliding window of time. The 4G eNB 14 could then sum those two measures of downlink throughput to compute the UE's aggregate downlink throughput across the UE's 4G and 5G connections.

In an example implementation, the minimum threshold level of throughput to maintain the UE's dual connectivity could be 1 megabit per second (Mbps), although other examples are possible as well.

If the 4G eNB 14 determines that the UE's aggregate throughput is at least the minimum threshold level, then the 4G eNB 14 may maintain the UE's dual connectivity. Whereas, if the 4G eNB 14 determines that the UE's aggregate throughput is below the minimum threshold level, then the 4G eNB 14 could responsively de-configure the UE's dual connectivity. For instance, the 4G eNB 14 could engage in signaling with the 5G gNB 18, the MME 28, and the UE to undo setup of any split bearer configured for the UE and to tear down the UE's 5G connection, thus transitioning the UE back to 4G-only service.

For this analysis, the sliding window period could be set to a desired duration to control the sensitivity of determining whether the UE's aggregate throughput is high enough to justify maintaining the UE's dual connectivity.

In practice, as noted above, when a UE is served by an access node on a relatively high-frequency carrier and is located far away from the access node and/or otherwise at a location where the UE faces RF obstructions or other interference issues, quality of the UE's air-interface communications could be relatively poor, and the UE's throughput could be relatively low. This low throughput could result from use of a low-order MCS corresponding with the UE's poor channel quality and/or from the need for more retransmissions also as a result of the UE's poor channel quality, among other possibilities. For the UE served with dual connectivity by the 4G eNB 14 and 5G gNB 18, such low throughput may contribute to the UE having threshold low aggregate throughput, which could result in the 4G eNB 14 de-configuring the UE's dual connectivity.

As discussed above, the disclosed mechanism could help to address this situation by automatically switching the UE to a lower-frequency, lower-path-loss carrier in response to a determination that the UE is headed toward a location where UEs that were served by the same access node on the same carrier as the UE have tended to lose their dual connectivity as a result of their having insufficient aggregate dual-connectivity throughput.

This process could be carried out with respect to the UE's connection with the MN and/or with respect to the UE's connection with the SN. Thus, in the EN-DC implementation above, the process could be carried out with respect to the UE's 4G connection with the 4G eNB 14 and/or with respect to the UE's 5G connection with the 5G gNB 18. For simplicity, the following discussion will focus mainly on an example implementation with respect to the UE's 4G connection, assuming that the UE is served by the 4G eNB 14 on a given 4G carrier (e.g., as a primary component carrier of the UE's 4G connection) as part of the UE's EN-DC service.

In the example implementation, a computing system could keep track of instances when UEs were served by the 4G eNB 14 on that carrier as part of EN-DC service and lost their EN-DC as a result of a least their having insufficient aggregate EN-DC throughput. And for each such instance, the 4G eNB 14 could further determine and record the geographic location where the UE was positioned at or near the time when the UE lost its EN-DC. The 4G eNB 14 could determine the UE's geographic location in various ways, such as by the UE reporting its geographic location in a recent wireless-coverage quality report to the 4G eNB 14 and/or from information provided by MLS 30, among other possibilities. Further, the 4G eNB 14 could perform a cluster analysis (e.g., using any clustering algorithm now known or later developed) on the geographic locations of these instances, in order to identify an EN-DC-loss area as a geographic location area where UEs served by the 4G eNB 14 on that carrier as part of EN-DC service have tended to lose their EN-DC as a result of their having had insufficient aggregate EN-DC throughput. The 4G eNB 14 could perform this analysis on an ongoing basis as well.

For the UE at issue, the 4G eNB 14 could further track the UE's geographic location over time and thereby determine that the UE is headed toward the determined EN-DC-loss area. The 4G eNB 14 could track the UE's geographic location over time as a series of location points that the 4G eNB 14 determines in the manner discussed above, among other possibilities. And the 4G eNB 14 could predict that the path of those location points leads to the determined EN-DC-loss area. For instance, the 4G eNB 14 could determine that the path defines a direction pointed toward the EN-DC-loss area and/or a path along a roadway or the like that leads to the EN-DC-loss area. Further, the 4G eNB 14 could factor in speed of movement of the UE to predict that the UE is approaching the EN-DC-loss, such as that the UE would arrive at the EN-DC-loss area in a threshold short period of time.

Alternatively, some or all of these operations could be carried out by the EMS 32 and/or another system. By way of example, the EMS 32 could receive from the 4G eNB 14 reports of UEs being served by the 4G eNB 14 on the carrier at issue as part of EN-DC having lost their EN-DC as a result of their having insufficient aggregate EN-DC throughput. And the EMS 32 could receive from the 4G eNB 14 and/or the MLS 30 the geographic locations where UEs were located when they experienced that EN-DC loss. The EMS 32 could then perform a cluster analysis to identify the EN-DC-loss area. And the EMS 32 could likewise determine from operational data when the UE at issue is being served by the 4G eNB 14 on the carrier as part of EN-DC and is approaching the determined EN-DC-loss area. The EMS 32 could then responsively signal to the 4G eNB 14 to notify the 4G eNB 14 of the situation.

In response to at least the determination that the UE at issue, served by the 4G eNB 14 on the given carrier, is moving toward (e.g., approaching) the determined EN-DC-loss area where UEs served by the 4G eNB 14 on that carrier as part of EN-DC service have tended to lose their EN-DC as a result of their having insufficient aggregate EN-DC throughput, the 4G eNB 14 could reconfigure the UE's 4G connection to be on a lower-frequency carrier. In particular, in response to at least that determination, the 4G eNB 14 could select another one of the 4G carriers 16 based on the selected 4G carrier being lower frequency than the given carrier (and perhaps additionally considering one or more other factors, such as carrier load or the like), and the 4G eNB 14 could reconfigure the UE's 4G connection to be on the selected carrier instead of on the given carrier. Without limitation, using the example bands noted above, for instance, if the given carrier is a band-41 carrier, the 4G eNB 14 might reconfigure the UE's 4G connection be on a band-25 carrier instead.

The 4G eNB 14 could so reconfigure the UE's 4G connection in various ways. For instance, the 4G eNB 14 could update the UE context record to indicate that the connection is now defined on the selected carrier (e.g., as a primary component carrier) rather than on the given carrier. And the 4G eNB 14 could transmit to the UE an RRC connection reconfiguration message that specifies the new configuration of the connection as being on the selected carrier rather than on the given carrier, to prepare the UE to be served on the selected carrier.

The 4G eNB 14 could then proceed to serve the UE on the reconfigured 4G connection as part of the UE's EN-DC service. Optimally by having moved the UE to the lower frequency carrier, however, the 4G eNB 14 might thereby have avoided the UE losing EN-DC by having insufficient aggregate EN-DC throughput when at the EN-DC-loss area.

As noted above, this process could likewise be implemented to control configuration of the UE's 5G connection. In that case, the 5G gNB 18 might report operational data to the 4G eNB 14 and/or to the EMS 32 or other system, and the 4G eNB 14 or that other system could determine when the UE served by the 5G gNB 18 on a given carrier as part of EN-DC service is headed to a determined EN-DC-loss area where UEs served by the 5G gNB 18 on that carrier as part of EN-DC service have tended to lose EN-DC as a result of their having insufficient aggregate EN-DC throughput. The 4G eNB 14 or other system could then signal to the 5G gNB 18 to cause the 5G gNB 18 to responsively switch the UE to a lower-frequency 5G carrier. Alternatively, the 5G gNB 18 could carry out some or all of this analysis itself.

Further, in a scenario where the 5G gNB 18 does not engage in RRC signaling with the UE, the 5G gNB 18 might signal to the 4G eNB 14 to facilitate reconfiguration of the UE's 5G connection, and the 4G eNB 14 might responsively transmit to the UE an associated RRC connection reconfiguration message specifying the new configuration of the UE's 5G connection as being on the selected lower-frequency 5G carrier.

FIG. 2 is next a flow chart depicting an example method for controlling an air-interface connection of a UE. As discussed above, the method could be operable in a wireless communication system including a first access node and a second access node. For instance, one of the access nodes could be a 4G eNB that provides 4G LTE service, and the other of the access nodes could be a 5G gNB that provides 5G NR service.

As shown in FIG. 2, at block 38, the method includes detecting that, when the UE has dual connectivity including a first air-interface connection extending between a first access node and the UE and a second air-interface connection extending between a second access node and the UE, and when the first air-interface connection is defined on a first RF carrier, that the UE is moving toward a geographic location where UEs that were served by the first access node on the first RF carrier as part of dual connectivity lost their dual connectivity due at least to their having insufficient aggregate dual-connectivity throughput. And at block 40, the method includes, based at least on the detecting, (i) selecting a second RF carrier based at least on the second RF carrier being lower frequency than the first RF carrier, such as being in a lower frequency band than the first RF carrier, and (ii) reconfiguring the first air-interface connection of the UE's dual-connectivity to be defined on the selected second RF carrier instead of on the first RF carrier.

In line with the discussion above, the act of detecting, when the UE has the dual connectivity, that the UE is moving toward the geographic area where UEs that were served by the first access node on the first RF carrier as part of dual connectivity lost their dual connectivity due at least to their having insufficient aggregate dual-connectivity throughput could involve (i) tracking geographic location of the UE over time and (ii) based at least on the tracking, determining that the UE is moving toward the geographic area where UEs that were served by the first access node on the first RF carrier as part of dual connectivity lost their dual connectivity due at least to their having insufficient aggregate dual-connectivity throughput.

Further, as discussed above, the method could additionally involve identifying a dual-connectivity-loss area as the geographic area where UEs that were served by the first access node on the first RF carrier as part of dual connectivity each lost their dual connectivity due at least to their having insufficient aggregate dual-connectivity throughput. For instance, identifying the dual-connectivity-loss area could involve (i) determining geographic locations where UEs were located when they were served by the first access node on the first RF carrier as part of dual connectivity and lost their dual connectivity due at least to their having insufficient aggregate dual-connectivity throughput and (ii) identifying a cluster of the determined geographic locations. And as noted above, the act of a UE losing its dual connectivity due at least to the UE having insufficient aggregate dual-connectivity throughput could involve the UE being transitioned from dual connectivity to standalone connectivity due at least to the UE having insufficient aggregate dual-connectivity throughput.

As additionally discussed above, this method could be carried out at least in part by the first access node, the second access node, and/or an element management system, among other possibilities. Further, as noted above, the first air-interface connection could be primary air-interface connection of the UE's dual connectivity (i.e., a connection with an MN) or a secondary air-interface connection of the UE's dual connectivity (i.e., a connection with an SN). And the first carrier could be a primary component carrier of the first air-interface connection.

In addition, as discussed above, the act of reconfiguring the first air-interface connection could involve transmitting to the UE a connection-reconfiguration message, such as an RRC connection reconfiguration message, that specifies a new configuration of the first air-interface connection.

Figure 3:
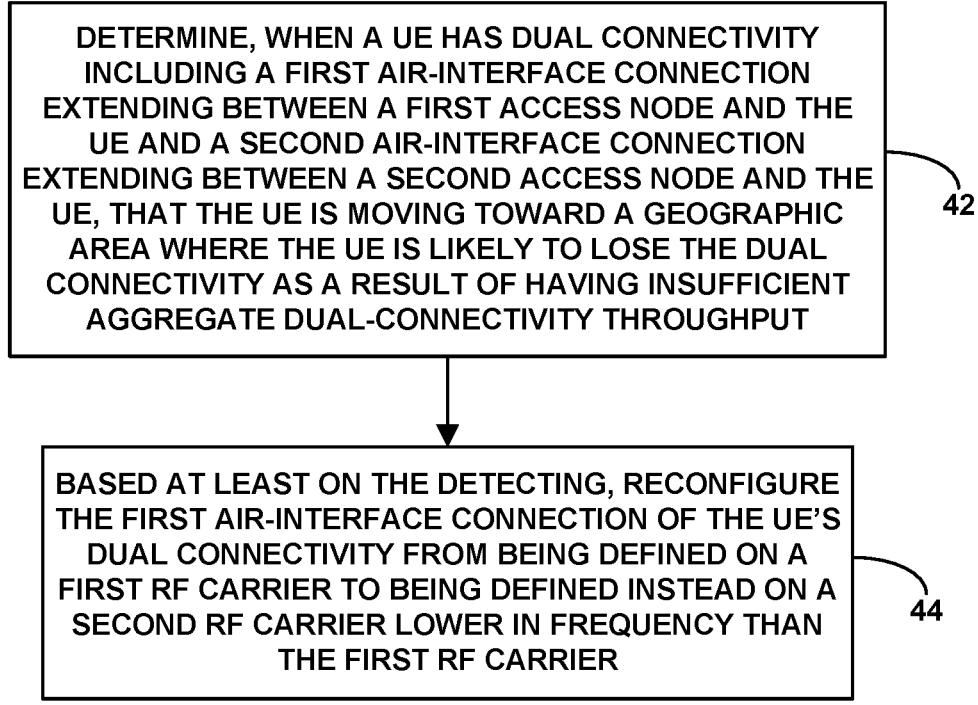
FIG. 3 is another flow chart depicting an example method in accordance with the present disclosure.

FIG. 3 is next another flow chart depicting an example method for controlling an air-interface connection of a UE in a context similar to that discussed above. As shown in FIG. 3, at block 42, the method includes determining, when a UE has dual connectivity including a first air-interface connection extending between the first access node and the UE and a second air-interface connection extending between the second access node and the UE, that the UE is moving toward a geographic area where the UE is likely to lose the dual connectivity as a result of having insufficient aggregate dual-connectivity throughput. And at block 44, the method includes, based at least on the detecting, reconfiguring the first air-interface connection of the UE's dual connectivity from being defined on a first RF carrier to being defined instead on a second RF carrier lower in frequency than the first RF carrier.

Various other features discussed herein can be implemented in this context as well, and vice versa.

Figure 4:
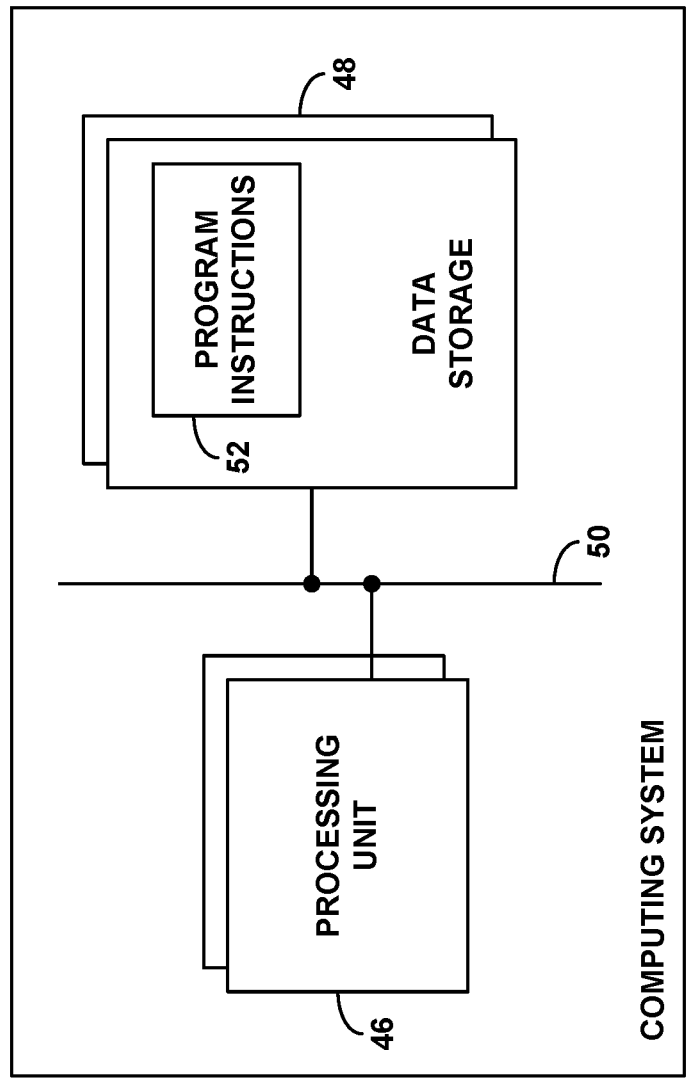
FIG. 4 is a simplified block diagram of an example computing system operable in accordance with the present disclosure.

FIG. 4 is next a simplified block diagram of a computing system that could carry out various features as described above. As noted above, this computing system could be provided at various entities, such as the first access node, at the second access node, and/or at an EMS, among other possibilities. As shown in FIG. 4, the computing system includes at least one processing unit 46 and at least one non-transitory data storage 48, which could be integrated or communicatively linked together by a system bus, network, or other connection mechanism 50.

The at least one processing unit 46 could comprise one or more processors (e.g., one or more general purpose processors and/or specialized processors), such as one or more microprocessors or specialized processors. And the at least one non-transitory data storage 48 could comprise one or more volatile and/or non-volatile storage components, such as magnetic, optical, or flash storage media. And as further shown, the at least one data storage 48 could hold, store, encode, or otherwise embody program instructions 52. In a representative implementation, those program instructions 52 could be executable by the at least one processing unit 46 to carry out various features described herein.

Figure 5:
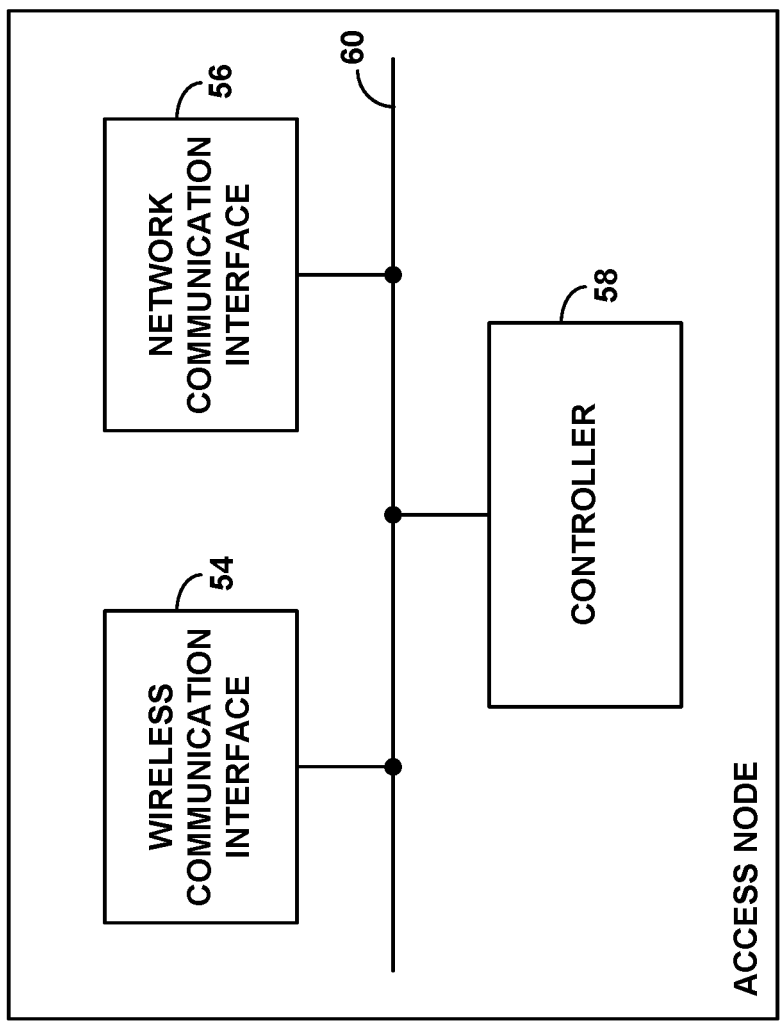
FIG. 5 is a simplified block diagram of an example access node operable in accordance with the present disclosure.

FIG. 5 is next a simplified block diagram depicting an example access node that could operate in accordance with the present disclosure. As shown, the example access node includes a wireless communication interface 54, a network communication interface 56, and a controller 58, all of which may be communicatively linked together by a system bus, network, or other connection mechanism 60.

In this example access node, the wireless communication interface 54 could comprise an antenna structure, which could be tower mounted or could take other forms, and associated components such as a power amplifier and a wireless transceiver, so as to facilitate providing a coverage area defining an air interface having a downlink and an uplink, and engaging in transmission and reception of user-plane data and control-plane signaling over the air interface in accordance with an applicable RAT. And the network communication interface 56 could comprise a wired or wireless interface, such as an Ethernet network communication interface, configured to support communication with other entities, such as with other network entities.

Further, controller 58 could comprise at least one processing (e.g., one or more general purpose processors and/or specialized processors) programmed to cause the access node to carry out various operations such as those discussed herein. For instance, the controller could comprise non-transitory data storage (e.g., one or more magnetic, optical, or flash storage components) holding program instructions executable by the processing unit to cause the access node to carry out such operations.

The present disclosure also contemplates at least one non-transitory computer readable medium having stored thereon (e.g., being encoded with) program instructions executable by at least one processing unit to carry out various operations described above.

Exemplary embodiments have been described above. Those skilled in the art will understand, however, that changes and modifications may be made to these embodiments without departing from the true scope and spirit of the invention.

What is claimed is:

1. A method operable in a wireless communication system including a first access node and a second access node, the method comprising:

detecting, when a user equipment device (UE) has dual connectivity including a first air-interface connection extending between the first access node and the UE and a second air-interface connection extending between the second access node and the UE, and when the first air-interface connection is defined on a first radio frequency (RF) carrier, that the UE is moving toward a geographic area where UEs that were served by the first access node on the first RF carrier as part of dual connectivity lost their dual connectivity due at least to their wireless-communication performance, wherein losing dual connectivity comprises transitioning from having dual connectivity to having standalone connectivity; and based at least on the detecting, (i) selecting a second RF carrier based at least on the second RF carrier being lower frequency than the first RF carrier and (ii) reconfiguring the first air-interface connection of the UE's dual connectivity to be defined on the selected second RF carrier instead of on the first RF carrier.

2. The method of claim 1, wherein detecting, when the UE has the dual connectivity, that the UE is moving toward the geographic area where UEs that were served by the first access node on the first RF carrier as part of dual connectivity lost their dual connectivity due at least to their wireless-communication performance comprises:

tracking geographic location of the UE over time; and
   based at least on the tracking, determining that the UE is moving toward the geographic area where UEs that were served by the first access node on the first RF carrier as part of dual connectivity lost their dual connectivity due at least to their wireless-communication performance.

3. The method of claim 1, further comprising identifying a dual-connectivity-loss area as the geographic area where UEs that were served by the first access node on the first RF carrier as part of dual connectivity each lost their dual connectivity due at least to their wireless-communication performance, wherein identifying the dual-connectivity-loss area comprises (i) determining geographic locations where UEs were located when they were served by the first access node on the first RF carrier as part of dual connectivity and lost their dual connectivity due at least to their wireless-communication performance and (ii) identifying a cluster of the determined geographic locations.

4. The method of claim 1, wherein a UE losing its dual connectivity due at least to the UE's wireless-communication performance comprises the UE being transitioned from dual connectivity to standalone connectivity due at least to the UE having insufficient aggregate dual-connectivity throughput.

5. The method of claim 1, wherein selecting the second RF carrier based at least on the second RF carrier being lower frequency than the first RF carrier comprises selecting the second RF carrier based on the second RF carrier being in a lower frequency band than the first RF carrier.

6. The method of claim 1, wherein the method is carried out by the first access node.

7. The method of claim 1, wherein the method is carried out at least in part by an element management system.

8. The method of claim 1, wherein the first air-interface connection is a primary air-interface connection of the UE's dual connectivity.

9. The method of claim 1, wherein the first air-interface connection is a secondary air-interface connection of the UE's dual connectivity.

10. The method of claim 1, wherein the first RF carrier is a primary component carrier of the first air-interface connection.

11. The method of claim 1, wherein reconfiguring the first air-interface connection comprises transmitting to the UE a connection-reconfiguration message that specifies a new configuration of the first air-interface connection.

12. The method of claim 1, wherein one of the first air-interface connection and the second air-interface connection is a 4G Long Term Evolution (4G LTE) connection, the other of the first air-interface connection and the second air-interface connection is a 5G New Radio (5G NR) connection, and the UE's dual-connectivity is EUTRA-NR Dual Connectivity (EN-DC).

13. A method operable in a wireless communication system including a first access node and a second access node, the method comprising:
   determining, when a user equipment device (UE) has dual connectivity including a first air-interface connection extending between the first access node and the UE and a second air-interface connection extending between the second access node and the UE, that the UE is moving toward a geographic area where the UE is likely to lose the dual connectivity as a result of their wireless-communication performance; and
   based at least on the determining, reconfiguring the first air-interface connection of the UE's dual connectivity from being defined on a first RF carrier to being defined instead on a second RF carrier lower in frequency than the first RF carrier.

14. A computing system comprising:
   at least one processing unit;
   at least one non-transitory data storage; and
   program instructions stored in the at least one non-transitory data storage and executable by the at least one processing unit to cause the following operations to be carried out:
      detecting, when a user equipment device (UE) has dual connectivity including a first air-interface connection extending between a first access node and the UE and a second air-interface connection extending between a second access node and the UE, and when the first air-interface connection is defined on a first radio frequency (RF) carrier, that the UE is moving toward a geographic area where UEs that were served by the first access node on the first RF carrier as part of dual connectivity lost their dual connectivity due at least to their wireless-communication performance, and
      based at least on the detecting, (i) selecting a second RF carrier based at least on the second RF carrier being lower frequency than the first RF carrier and (ii) reconfiguring the first air-interface connection of the UE's dual connectivity to be defined on the selected second RF carrier instead of on the first RF carrier.

15. The computing system of claim 14, wherein detecting, when the UE has the dual connectivity, that the UE is moving toward the geographic area where UEs that were served by the first access node on the first RF carrier as part of dual connectivity lost their dual connectivity due at least to their wireless-communication performance comprises:
   tracking geographic location of the UE over time; and
   based at least on the tracking, determining that the UE is moving toward the geographic area where UEs that were served by the first access node on the first RF carrier as part of dual connectivity lost their dual connectivity due at least to their wireless-communication performance.

16. The computing system of claim 14, wherein the operations further include identifying a dual-connectivity-loss area as the geographic area where UEs that were served by the first access node on the first RF carrier as part of dual connectivity each lost their dual connectivity due at least to their wireless-communication performance,
   wherein identifying the dual-connectivity-loss area comprises (i) determining geographic locations where UEs were located when they were served by the first access node on the first RF carrier as part of dual connectivity and lost their dual connectivity due at least to their wireless-communication performance and (ii) identifying a cluster of the determined geographic locations.

17. The computing system of claim 14, wherein selecting the second RF carrier based at least on the second RF carrier being lower frequency than the first RF carrier comprises selecting the second RF carrier based on the second RF carrier being in a lower frequency band than the first RF carrier.

18. The computing system of claim 14, wherein the computing system is disposed at least in part at the first access node.

19. The computing system of claim 14, wherein the first air-interface connection is a primary air-interface connection of the UE's dual connectivity.

20. The computing system of claim 14, wherein reconfiguring the first air-interface connection comprises transmitting to the UE a connection-reconfiguration message that specifies a new configuration of the first air-interface connection.

* * * * *